United States Patent [19]

Rieben

[11] Patent Number: 4,659,901
[45] Date of Patent: Apr. 21, 1987

[54] PARTICULATE COLLECTION SYSTEM FOR LASER WELDING APPARATUS

[75] Inventor: Stuart L. Rieben, Mt. Lebanon, Pa.

[73] Assignee: Westinghouse Electric Corp., Pittsburgh, Pa.

[21] Appl. No.: 629,529

[22] Filed: Jul. 10, 1984

[51] Int. Cl.⁴ .............................................. B23K 27/00
[52] U.S. Cl. ........................ 219/121 LC; 219/121 LG; 219/121 FS
[58] Field of Search ................ 219/121 LC, 121 LD, 219/121 L, 121 LH, 121 LG, 121 FS, 121 EL, 121 EN, 121 EQ, 121 EZ, 121 PG; 51/270, 273; 228/215, 214, 218–221

[56] References Cited

U.S. PATENT DOCUMENTS

| | | | |
|---|---|---|---|
| 2,603,817 | 7/1952 | Anthony | 51/270 X |
| 3,005,296 | 10/1961 | Roojen | 51/270 |
| 3,009,050 | 11/1961 | Steigerwald | 219/121 EZ |
| 3,651,607 | 3/1972 | Lee, II | 51/270 |
| 4,000,392 | 12/1976 | Banas et al. | 219/121 LC |
| 4,027,137 | 5/1977 | Liedtke | 219/121 FS |
| 4,078,167 | 3/1978 | Banas et al. | 219/121 FS |
| 4,127,761 | 11/1978 | Pauley et al. | 219/121 LC |
| 4,128,753 | 12/1978 | Sharp | 219/121 LC |
| 4,149,062 | 4/1979 | Limmer et al. | 219/121 FS |
| 4,151,034 | 4/1979 | Yamamoto et al. | 219/121 PG X |
| 4,162,390 | 7/1979 | Kelly | 219/121 LC |
| 4,244,529 | 1/1981 | DeGabriele et al. | |
| 4,255,169 | 3/1981 | Leliaert et al. | 51/270 X |
| 4,315,133 | 2/1982 | Morgan et al. | 219/121 FS |
| 4,378,851 | 4/1983 | DeVries | |
| 4,423,303 | 12/1983 | Hirose et al. | 219/121 PG |
| 4,492,843 | 1/1985 | Miller et al. | 219/121 LC |

FOREIGN PATENT DOCUMENTS

54-51097  4/1979  Japan ............................ 219/121 LD

Primary Examiner—Philip H. Leung

[57] ABSTRACT

Welding apparatus is disclosed for collecting and disposing of the extraneous work piece particles thrown off during the machining and, in particular, the welding of the workpiece. The welding apparatus comprises a welding chamber for receiving the work piece and for establishing a welding environment about the work piece. The welding chamber has an opening and an input port for introducing a non-reactive gas into the welding chamber to establish the welding environment within the welding chamber. An output port is associated with its welding chamber for permitting the escape of the non-reactive gas therefrom. A manifold is disposed about the output port for receiving and collecting the non-reactive gas and the work piece particles suspended therein. A sealing assembly is associated with the opening for operating in a first mode for sealing the opening to prevent escape of the non-reactive gas except through the output port and the manifold means, and in a second mode to permit escape of the non-reactive gas through the opening.

24 Claims, 17 Drawing Figures

PARTICULATE COLLECTION SYSTEM FOR LASER WELDING APPARATUS

CROSS-REFERENCE TO COPENDING APPLICATIONS

Attention is drawn to the following copending, commonly assigned applications, all/each incorporated specifically by reference into the instant specification:
(1) "FUEL GRID WITH SLEEVES WELDED IN NOTCHED GRID STRAPS" filed Sept. 1, 1982 in the name of R. Duncan, Ser. No. 414,232, now U.S. Pat. No. 4,521,374;
(2) "PULSED LASER MACHINING APPARATUS" filed Sept. 1, 1982 in the names of R. A. Miller and G. D. Bucher, Ser. No. 414,264, now U.S. Pat. No. 4,560,856;
(3) "APPARATUS AND METHOD FOR LASER MACHINING IN NON-REACTIVE ENVIRONMENT" filed Sept. 1, 1982 in the names of R. A. Miller and G. G. Lessman, Ser. No. 414,242, now U.S. Pat. No. 4,492,843;
(4) "STRAP AND VANE POSITIONING FIXTURE FOR FUEL ROD GRID AND METHOD" filed Sept. 1, 1982 in the names of R. F. Antol, R. W. Kalkbrenner and R. M. Kobuck, Ser. No. 414,197, now U.S. Pat. No. 4,539,738;
(5) "GRID ASSEMBLY FIXTURE, RETENTION STRAP AND METHOD" filed Sept. 1, 1982 in the names of R. M. Kobuck and R. W. Kalkbrenner, Ser. No. 414,198, now U.S. Pat. No. 4,519,593;
(6) "LASER MACHINING SYSTEM" filed Sept. 1, 1982 in the names of D. L. Wolfe, J. W. Clements and J. S. Kerrey, Ser. No. 414,241, now U.S. Pat. No. 4,541,055;
(7) "MOVABLE MACHINING CHAMBER WITH ROTATABLE WORK PIECE FIXTURE" filed Sept. 1, 1982 in the names of R. F. Antol, R. Kalkbrenner and D. L. Wolfe, Ser. No. 414,263, now U.S. Pat. No. 4,501,949;
(8) "WORK PIECE GRIPPING AND MANIPULATING APPARATUS FOR LASER WELDING SYSTEMS AND THE LIKE" filed Sept. 1, 1982 in the names of R. Kalkbrenner and R. Kobuck, Ser. No. 414,262, now U.S. Pat. No. 4,538,956;
(9) "WELDING PLATES FOR A FUEL ROD GRID" filed Sept. 1, 1982 in the names of R. M. Kobuck, R. Miller, R. W. Kalkbrenner, J. Kerrey and R. Duncan, Ser. No. 414,265, now U.S. Pat. No. 4,492,844;
(10) "PLURAL COMPUTER CONTROL FOR SHARED LASER MACHINING" filed Sept. 1, 1982 in the names of J. W. Clements and W. D. Lanyi, Ser. No. 414,204, now U.S. Pat. No. 4,547,855;
(11) "GRID AND SLEEVES WELDING FIXTURE AND METHOD" filed Sept. 1, 1982 in the names of J. S. Kerrey and R. Duncan, Ser. No. 414,203, now U.S. Pat. No. 4,522,330;
(12) "CALIBRATION OF AUTOMATED LASER MACHINING APPARATUS" filed Sept. 2, 1982 in the names of J. W. Clements and J. R. Faulkner, Ser. No. 414,272, now U.S. Pat. No. 4,545,018;
(13) "RIGID SUPPORT FOR LASER MACHINING APPARATUS" filed Sept. 1, 1982 in the name of D. L. Wolfe, Ser. No. 414,191, now U.S. Pat. No. 4,493,967;
(14) "LASER LENS AND LIGHT ASSEMBLY" filed Sept. 1, 1982 in the names of R. Antol, R. W. Kalkbrenner and R. M. Kobuck, Ser. No. 414,205, now U.S. Pat. No. 4,518,843; and
(15) "BEAM ALIGNMENT SYSTEM FOR LASER WELDING SYSTEM" filed June 19, 1984 in the names of W. H. Kasner, R. A. Miller and W. A. Toth, Ser. No. 622,296, now U.S. Pat. No. 4,574,180.

BACKGROUND OF THE INVENTION

1. Field of the Invention

This invention, in its preferred form, relates to apparatus for laser machining a work piece and more particularly to apparatus for collecting and removing particles or fines produced in the course of laser machining. More particularly, this invention relates to apparatus for sealing a welding chamber while the laser machining takes place, for directing an inert gas into the welding chamber, for removing the inert gas with the fines suspended therein and for collecting the fines.

2. Description of the Prior Art

Figure 1:
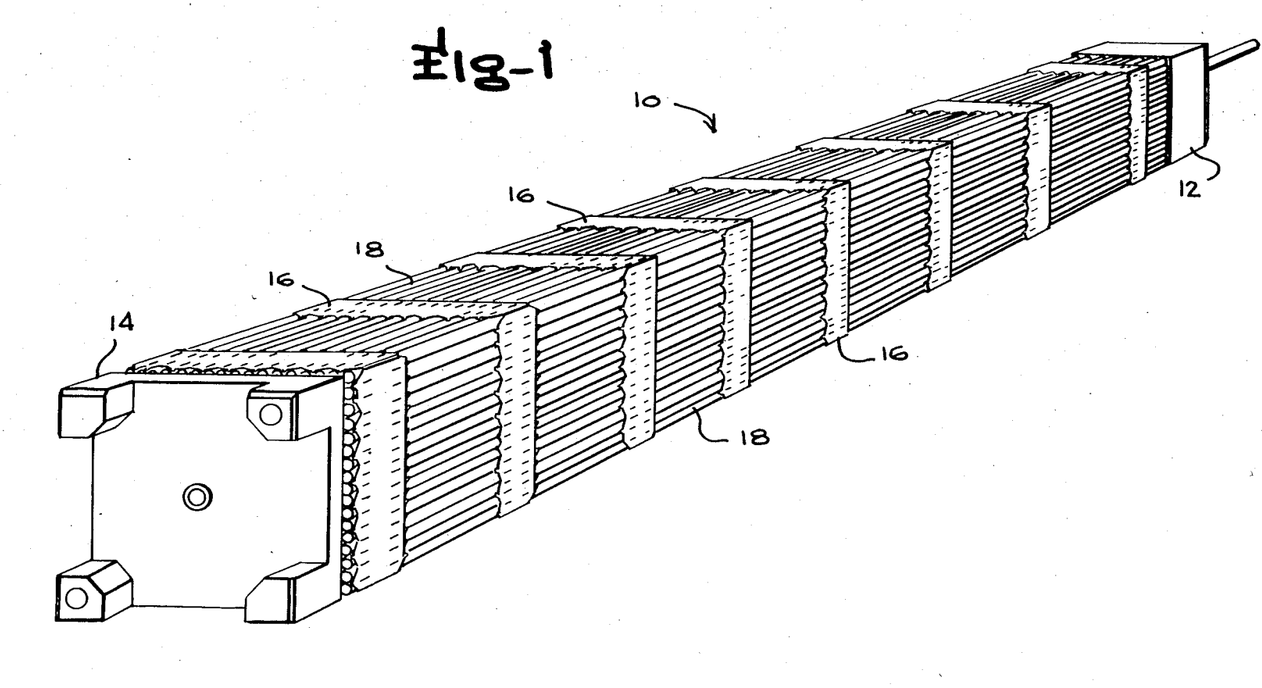
FIG. 1 is a perspective view of a nuclear fuel rod bundle assembly incorporating a plurality of grids.

The precision laser machining apparatus of this invention relates generally to the manufacture of nuclear fuel bundle assemblies 10 as shown in FIG. 1 of the drawings. As shown, the nuclear fuel bundle assembly 10 is a self-contained unit comprised of a top nozzle assembly 12 and a bottom nozzle assembly 14, between which is disposed a matrix of nuclear fuel rods 18 arrayed in rows and columns and held in such configuration by a plurality of fuel rod grids 16. Though not shown in FIG. 1, control rods are included at selected positions within the array of nuclear fuel rods 18. The assemblies 12 and 14 and the fuel rod grids 16 provide a skeletal frame to support the fuel rods 18 and the control rods. The nuclear fuel bundle assemblies 10 are loaded into predetermined locations within a nuclear reactor and, therefore, the orientation of the fuel rods 18 with respect to each other is rigorously controlled.

Figure 2A:
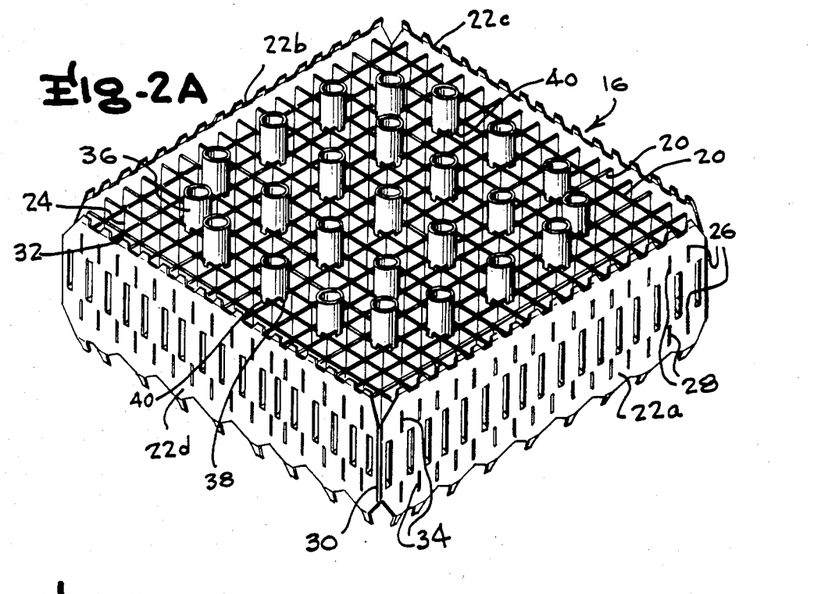
FIGS. 2A, 2B and 2C are respectively a perspective view, a plan view, and a sectioned side view of a fuel rod grid incorporated into the assembly of FIG. 1.
Figure 2B:
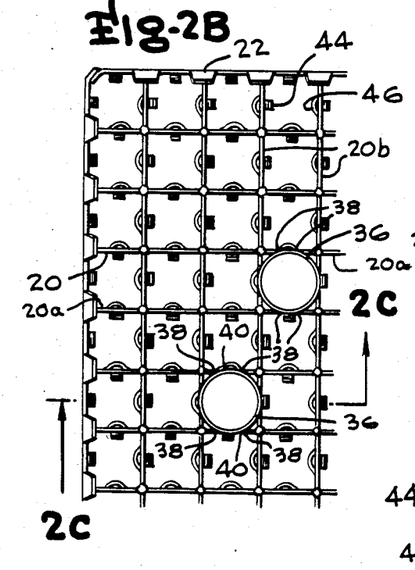
Figure 2C:
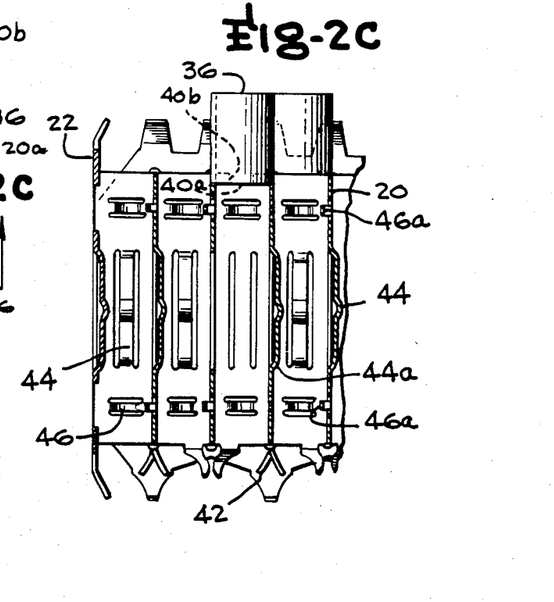

The precision laser welding apparatus of this invention is, in one illustrative embodiment thereof, related to the manufacture of fuel rod grids 16 as shown in FIGS. 2A to 2C. The fuel rod grid 16 is of an approximately square configuration, whose periphery is formed by four outer grid straps 22. Each end of an outer grid strap 22 is welded by a corner seam weld 30 to the end of a perpendicularly disposed outer grip strap 22. A plurality of inner grid straps 20 is disposed in rows and columns perpendicular to each other, whereby a plurality of cells are formed to receive the control rods and the nuclear fuel rods 18. The inner grid straps 20 disposed along the rows and columns have complementary slots therein at each of the points 24 of intersection for receiving a perpendicularly disposed inner grid strap 20. An intersect weld 32 is formed at each of the points 24 of intersection, whereby a rigid egg crate structure is formed. Further, each of the inner grid straps 20 includes at each end a pair of tabs 26 of a size and configuration to be tightly received in either a top or bottom row of slots 28 formed in the outer grid straps 22, as shown in FIG. 2A. A slot and tab weld 34 is effected along the top and bottom rows formed by the slots 28 within the outer grid straps 22.

Further, a plurality of guide sleeves 36 is disposed on the sleeve side surface of the fuel rod grid 16 to receive and guide the control rods disposed therein. A series of notch seam welds 40 securely attaches the guide sleeves 36 to corresponding notches 38 formed within the inner grid straps 20. The precision laser welding apparatus of this invention is particularly adapted to perform a series of controlled welding operations whereby each of the welds 30, 32, 34, and 40 is carried out. It is understood that after each such weld, the fuel rod grid 16 is repositioned and/or the focal point of the laser beam changed to effect the particular type of weld desired.

Referring now to FIGS. 2B and 2C, the plurality of resilient fingers 44 is disposed longitudinally of the inner grid straps 20 in a parallel relationship to each other. A pair of spacing fingers 46 is disposed on either side of a corresponding resilient finger 44 and serves along with the resilient finger 44 to provide a resilient grip of the nuclear fuel rods 18 that are disposed within the cell formed by the intersecting inner grid straps 20. A resilient finger 44a is disposed to the right as seen in FIG. 2C in an opposing relationship to the spacing finger 46a, whereby a nuclear fuel rod 18 is resiliently held therebetween.

The fuel rod grid 16 is machined and in particular welded. In order to perform the intersect welds 32, the fuel rod grid 16 is incrementally moved along each of its X and Y axes, stopping at each of a plurality of positions wherein the laser beam is aligned with each of the intersections of the inner grid straps 20. Once positioned, a laser source is energized to emit a laser beam onto the aligned point of intersection to thereby effect an intersect weld 32. Thereafter, the fuel rod grid 16 is moved to the next position and another intersect weld 32 is made. The slot and tab welds 34, as well as the corner seam welds 30, are made by rotating the fuel rod grid 16 about its Y axis so that each of its outer grid straps 22 is presented to the laser beam for welding. In addition, notch seam welds 40 securing the guide sleeves 36 within the notches 38 of the inner grid straps 20 are carried out by rotating the fuel rod grid 16 to a position disposed at an angle of 45° with respect to the laser beam to thereby expose the interface between the guide sleeves 36 and the slots 38 to the laser beam. The laser beam is initially focused to perform the intersect welds 32 as are carried out within a single plane in which the intersect welds lie. In order to make the corner seam welds 30 and the slot and tab welds 34, it is necessary to rotate the fuel rod grid 16 out of the plane of the intersect welds 32, thus requiring the refocusing of the laser beam. In similar fashion, the fuel rod grid 16 is rotated from the plane of the intersect welds 32 to its 45° angle position with respect to the laser beam, thus also requiring a refocusing of the laser beam before precision welding may be carried out.

Figure 3:
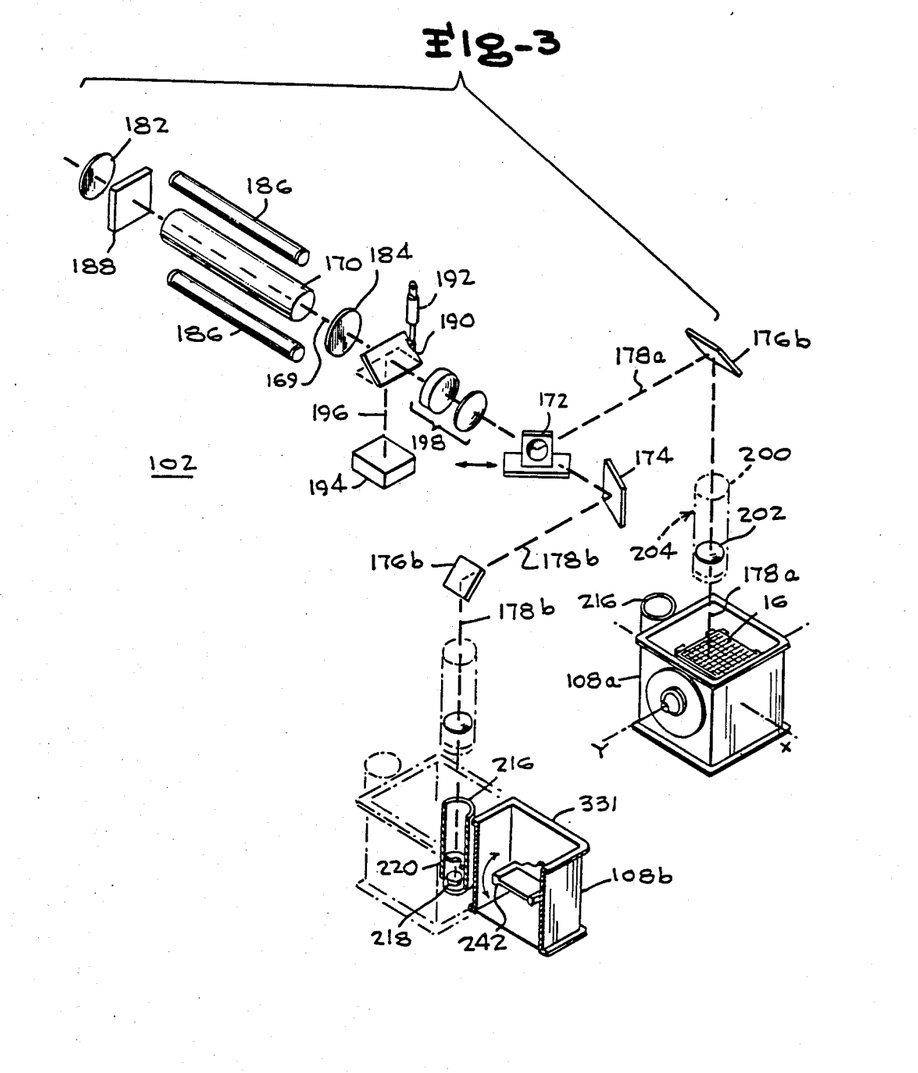
FIG. 3 is a perspective, schematic representation of a laser machining system for directing on a time shared basis a laser beam emitted from a single laser source to each of two work pieces, e.g. the nuclear fuel rod grids, as shown in FIGS. 2A, 2B and 2C.
Figure 4:
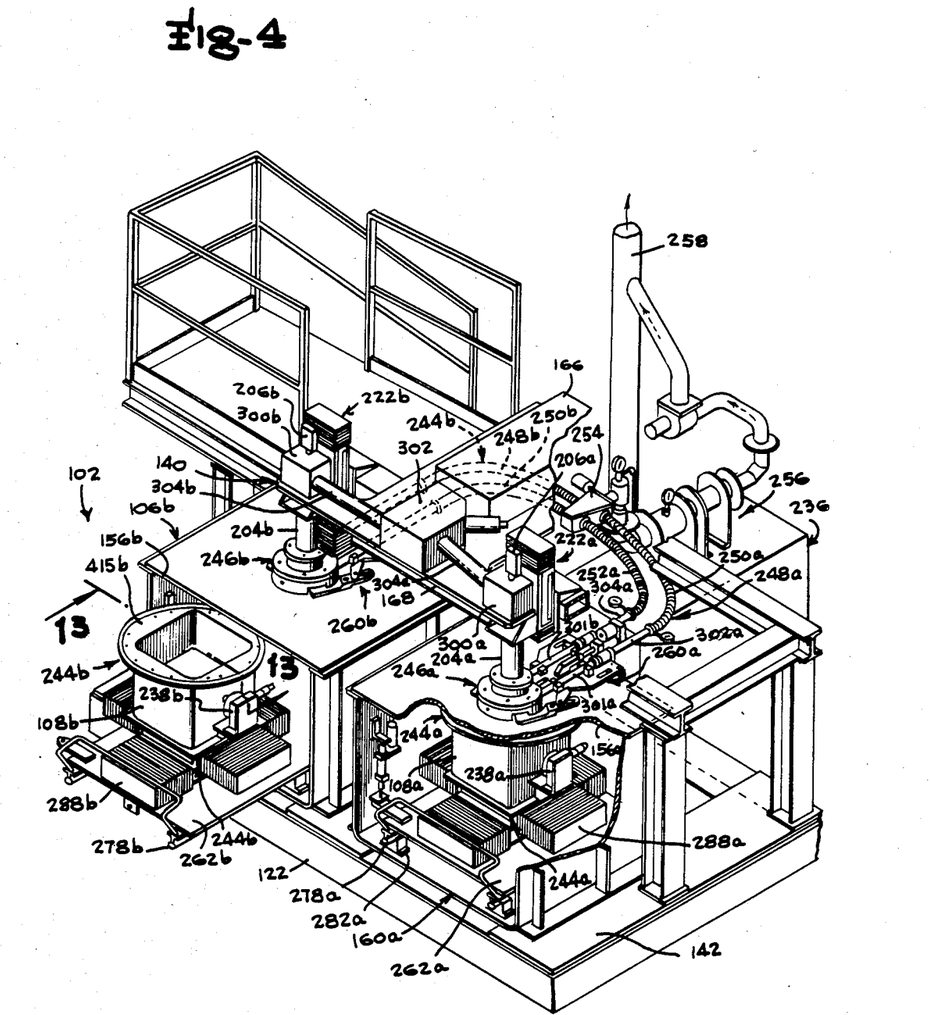
FIG. 4 is a perspective view of the laser welding apparatus, as schematically shown in FIG. 4, and including a particulate collection system, in accordance with the teachings of this invention.

As described in the copending application entitled "ARGON PURGED WELDING CHAMBER" Ser. No. 414,242, U.S. Pat. No. 4,492,843 a laser welding system 102, as shown in FIGS. 3 and 4, controls the series of welds and, in particular, the intersect welds 32, the slot and tab welds 34, the corner seam welds 30, and the notch seam welds 40 necessary to secure the inner and outer grid straps 20 and 22 together to form the fuel rod grid 16 and to secure the guide sleeves 36 to the grid 16. As will be detailed below, FIG. 4 does disclose features not included in any of the above referenced copending applications. As shown in FIG. 3, the laser system 102 emits a laser beam 169 of controlled energy, successively and precisely positions the grid 16, and controls the supply of a suitable inert gas, e.g., argon, into a pair of welding chambers 108a and 108b, wherein the laser welding of the aforementioned welds is carried out. Each of the work pieces, e.g., the fuel rod grids 16, is successively moved to each of the weld positions by its positioning module 106a or 106b. In particular, one of the pair of welding chambers 108a and 108b is associated with each of the positioning modules 106 for receiving its grid 16 to establish an environment in which the laser welding may be carried out and, in particular, to establish an atmosphere of the inert gas while permitting movement of the grid 16 to effect the series of welds.

A main frame 122 is more fully shown in FIG. 4 for mounting adjustably the laser system 102 in an aligned position with respect to the right and left positioning modules 106a and 106b. Once aligned with the laser system 102, the right and left positioning modules 106a and 106b are fixedly secured with respect to the main frame 122 and therefore with respect to the laser system 102 to ensure that the alignment of the laser beam 169 may be accurately controlled with respect to each of the positioning modules 106a and 106b and therefore with respect to the fuel rod grids 16 carried thereby. The main frame 122 is made up of a top plate 142 and a bottom plate (not shown), each welded to a frame of square tubing. The top plate 142 is machined flat after it has been welded to its frame of square tubings to provide a reference surface for the other system components that are mounted thereon. These other components are bolted or doweled to or with respect to the top plate 142 so that the critical alignments can be maintained.

As shown in FIG. 4, each of the positioning modules 106a and 106b includes a slide table 262. Each slide table 262 is mounted for rectilinear movement by a pair of bearing shafts 278 affixed to its lower surface. Each of the bearing shafts 278 slidably moves upon corresponding ones of a pair of pillow blocks 282, whereby the slide table 262 and its welding chamber 108 may be withdrawn from its positioning module 106. Each welding chamber 108 is mounted upon an X-Y platform 244. Each X-Y platform 244 is mounted upon an X-Y positioning system 288 by which its welding chamber 108 is incrementally moved along X and Y axes under the control of a computer, as explained in the above-referenced copending patent application entitled, "ARGON PURGED WELDING CHAMBER". Each of the positioning modules 106 further includes a top or sealing plate 156 that is disposed in a close spacing with and forms the enclosing top surface of its welding chamber 108.

A kinematic support 140, shown in FIG. 4, positions the laser system 102, as shown in FIG. 3. The laser system 102 includes a source of laser emission in the form of a laser rod 170 and the related optics with respect to the reference surface of the main frame 122 and more specifically with respect to the work pieces in the form of the fuel rod grids 16, as shown in FIG. 4. As shown in FIG. 4, the laser rod 170 is disposed within a laser head housing 166 and is mounted upon an optical tooling plate 168 which has been machined to very close tolerances for flatness. In addition to the laser head housing 166, a movable beam switching mirror 172 and its actuator in the form of a linear electric motor (not shown) and stationary beam diverters in the form of mirrors 174, 176a and 176b are also mounted upon the optical tooling plate 168. As shown in FIG. 3, the beam switching mirror 172 is mounted for rectilinear motion into and out of position to reflect or to transmit the laser beam 178 emitted from the laser rod 170.

The laser system 102, as shown schematically in FIG. 3, may, in one illustrative embodiment of this invention, take the form of that laser system manufactured by Raytheon under their model designation number SS500. The laser system 102 includes the laser rod 170 illustratively taking the form of a Nd:YAG crystal laser and a pair of linear krypton flash lamps 186 disposed in a high efficiency, laser head. The laser head includes a total reflecting mirror 182 and a partial reflecting mirror 184 disposed on either end of the laser 170. An inner cavity shutter 188 is disposed between the laser rod 170 and the total reflecting mirror 182 and is selectively controlled to release a selected number of lasing pulses, whereby the energy imparted to effect laser welding may be precisely controlled in a manner to be explained below. The laser head is modularly constructed to permit all optic elements thereof including the laser 170, the excitation lamps 186, and the mirrors 182 and 184 to be easily and independently replaced. The excitation lamps 186 may be quickly replaced without disturbing the optical alignment. Further, the excitation or flash lamps 186 are water cooled over their entire length, including their end connectors. Lamp triggering provides for parallel pulsing of the excitation lamps 186 by energizing the cavity.

A dump shutter 190 is disposable in a first position to direct the laser beam 169 along a diverted path 196 into a beam absorber 194 during those periods in which the work pieces in the form of the fuel rod grids 16 are being changed within the chambers 108. An actuating mechanism 192 is shown for disposing the shutter 190 from its first beam intercepting position to a second position, wherein the beam 169 is focused by a beam expander lens assembly 198 to a beam directing mechanism comprised of the movable beam switching mirror 172 and the stationary mirror 174. When the switching mirror 172 is disposed to intercept the laser beam 169, it is diverted along path 178a to the mirror 176a to be directed vertically downward. The laser focusing lens assembly 204a intercepts and focuses the laser beam 169 directed along path 178a onto the fuel rod grid 16 within the chamber 108a. The laser focusing lens assembly 204 includes a lens 202 and a lens carrier tube 200 as rectilinearly positioned by the Z-axis laser assembly 222, as shown in FIG. 4. When the switching mirror 172 is slidably disposed by the linear electric motor (not shown) from a position intercepting the laser beam 169, it is directed by the stationary reflective mirror 174 along the path 178b to be vertically directed by mirror 176b towards the welding chamber 108b.

Figure 5:
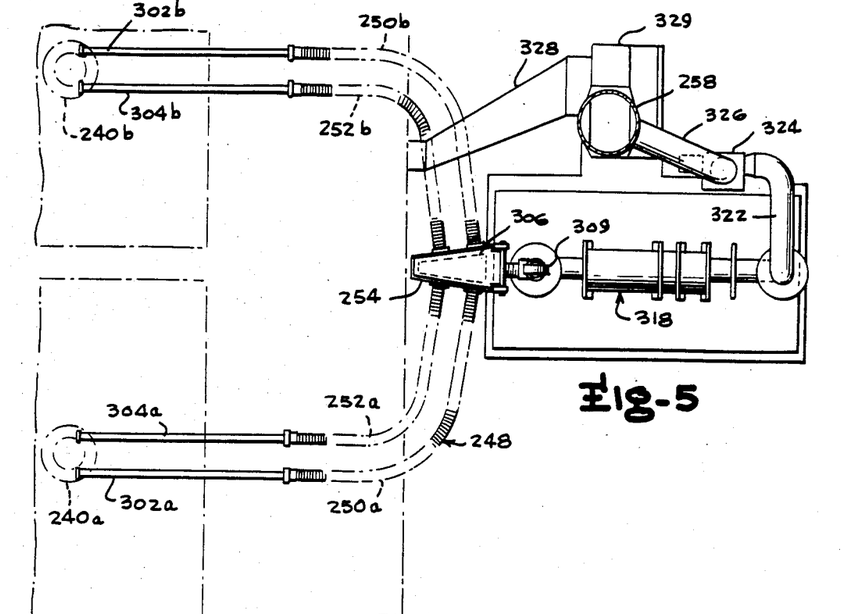
FIGS. 5 and 6 are respectively plan and side views of the laser welding apparatus shown in FIG. 4, particularly illustrating the particulate collection system of this invention.
Figure 6:
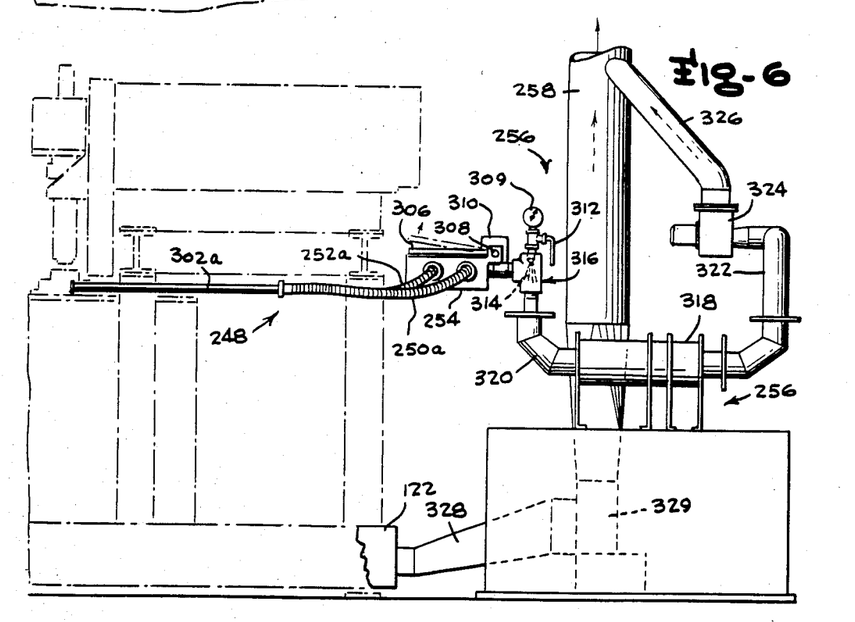

As described in the above referenced copending application entitled, "ARGON PURGED WELDING CHAMBER", each of the welding chambers 108 may be withdrawn from its respective positioning module 106 to permit a fuel rod grid 16 that has been welded to be replaced with a new grid 16. The chamber 108b, as shown in FIGS. 3 and 4, is in a position whereby the new fuel rod grid 16 may be readily be disposed therein and mounted upon a rotatable fixture 242. Thereafter, the slide 262 and its welding chamber 108 is redisposed within the positioning module 106. As shown in FIG. 3, the welding chamber 108 has an upper-most flange 109 that is disposed at a relatively close spacing from the sealing plate 156. In the laser welding system, as described in the above identified copending application entitled, "ARGON PURGED WELDING CHAMBER", an inert gas, e.g., argon, is introduced into the welding chamber 108 through ports (not shown) within the rotatable fixture 242 and through a diffuser plate (not shown) disposed in the bottom of the welding chamber 108. After the welding chamber 108 has been reintroduced within its positioning module 106, the rate of flow of argon into the welding chamber 108 is increased, whereby the entrained air and moisture introduced into the welding chamber 108 during the loading process may be purged through a narrow spacing left between the flange 109 and the lower-most surface of the sealing plate 156. Argon overflows the flange 109 and falls through large openings (not shown) within the main frame 122, which serves as an exhaust plenum, as well as a support base. As shown in FIGS. 5 and 6, a duct blower 329 causes a negative pressure within the main frame 122, whereby the collected argon gas is exhausted via a transition duct 328 and an exhaust conduit 258 to the exterior of the building enclosing the laser welding apparatus 102.

Argon will continue to flow at a relatively high rate until the welding chamber 108 is purged of entrained air and moisture aspirated during the grid loading. A moisture sensor and an oxygen detector (not shown) are incorporated within the welding chamber 108 to continuously monitor the chamber atmosphere. When preset moisture and oxygen levels are reached, laser welding will again be permitted. Argon is continued to be introduced into the welding chamber 108 during the welding process, as described above, but at a reduced rate.

The fuel rod grids, as described above with respect to FIGS. 2A, 2B, and 2C, are illustratively made of zircaloy. The welding of the zircaloy grids 16 generates particulate matter or fines which must be removed. The quantity of particulate matter is relatively low, less than one-half gram per grid 16. However, in the course of manufacturing a number of such grids 16, the accumulation of zircaloy fines can be hazardous. The zircaloy fines are pyrophoric, and can cause unexpected explosions and fires.

The zircaloy fines may collect anywhere that the flow of argon carrying the fines passes through a restricted opening. Major accumulations occur on the flange 109, as shown in FIG. 3, and within the main frame 122, as shown in FIG. 4. The main frame includes cross braces (not shown) which isolate portions of the base and prevent cleaning. In addition, in the laser welding system as described in the above referenced copending patent application entitled, "ARGON PURGED WELDING CHAMBER", the flow of gas passes upwardly from the welding chamber 108 and about the laser focusing lens assembly 204, whereby the zircaloy fines deposit on top of the sealing plate 168. The zircaloy fines deposit wherever the gas stream velocity is low enough for a particle to settle under the influence of gravity.

SUMMARY OF THE INVENTION

It is therefore an object of this invention to provide a new and improved laser machining apparatus, wherein particles of the work product are collected.

It is a further object of this invention to provide new and improved laser welding apparatus, wherein pyrophoric fines or particles of the work piece are directed by fluid flow through and from the welding chamber to be removed, subsequently, from the fluid flow.

In accordance with these and other objects of this invention, this invention comprises welding apparatus for collecting and disposing of the extraneous work piece particles thrown off during the machining and, in particular, the welding of the workpiece. The welding apparatus comprises a welding chamber for receiving the work piece and for establishing a welding environment about the work piece. The welding chamber has an opening through which the workpiece is received and an input port for introducing a non-reactive gas into the welding chamber to establish the welding environment within the welding chamber. Output port means are associated with the welding chamber for permitting the escape of the non-reactive gas therefrom. A manifold is disposed about the output port for receiving and collecting the non-reactive gas and the work piece particles suspended therein. A sealing assembly associated with the opening for operating in a first mode for sealing the opening to prevent escape of the non-reactive gas except through the output port and the manifold means, and in a second mode to permit escape of the non-reactive gas through the opening.

In a further aspect of this invention, the welding apparatus includes a sealing plate disposed at a substantially uniform spacing from the upper edge disposed about the welding chamber opening. Means illustratively in the form of a laser is provided for generating and directing the welding beam through the output port into the welding chamber and onto the work piece. The welding beam is disposed in a fixed relationship with respect to the sealing plate. A drive mechanism moves selectively the welding chamber and the work piece with respect to the welding beam and the sealing plate.

A sealing assembly is associated with the welding chamber and operative in a first mode for sealing the spacing to prevent escape of the non-reactive gas except through the output port and the manifold, and in a second mode for permitting the non-reactive gas to escape through the spacing.

Further, a mechanism is provided for releasably securing the manifold with respect to the output port whereby the manifold may be removed and cleaned of the work piece particles. The securing mechanism includes a conduit adapted to be coupled and decoupled with respect to said output opening of the manifold, and serves to dispose the conduit in a first position, whereby the conduit is coupled with the output opening to permit the flow of the gas with the work piece particles suspended therein from the manifold through the conduit, and a second position remote of the manifold wherein the manifold may be readily removed from the output port. The securing mechanism also includes a latch coupled to a movable plate to be disposed between a first position free of the manifold and a second position, wherein the latch engages the manifold and secures the manifold with respect to the output opening.

BRIEF DESCRIPTION OF THE DRAWINGS

A detailed description of the preferred embodiment of this invention is hereafter made with specific reference being made to the drawings, in which.

DESCRIPTION OF THE PREFERRED EMBODIMENT

Referring now to FIG. 4, there is shown a particulate collection system 236 in accordance with the teachings of this invention. The particulate collection system 236 includes a pair of pneumatically actuated chamber sealing assemblies 244a and 244b, which are respectively mounted by seal support assemblies 415a and 415b about the opening of each of the welding chamber 108. As will be explained below, the chamber sealing assembly 244 effects a sealing of the welding chamber 108 by forming a seal between the chamber flange 109 (see FIG. 3) or the seal support assembly 412 and the lower surface of the sealing plate 156. It is understood that the chamber sealing assembly 244 will be actuated only when the welding chamber 108 is disposed within its positioning module 106, i.e., the chamber sealing assembly 244a, as shown in FIG. 4 as associated with the welding chamber 108a could be actuated in order to seal the welding chamber 108a with respect to the sealing plate 156a.

Figure 8:
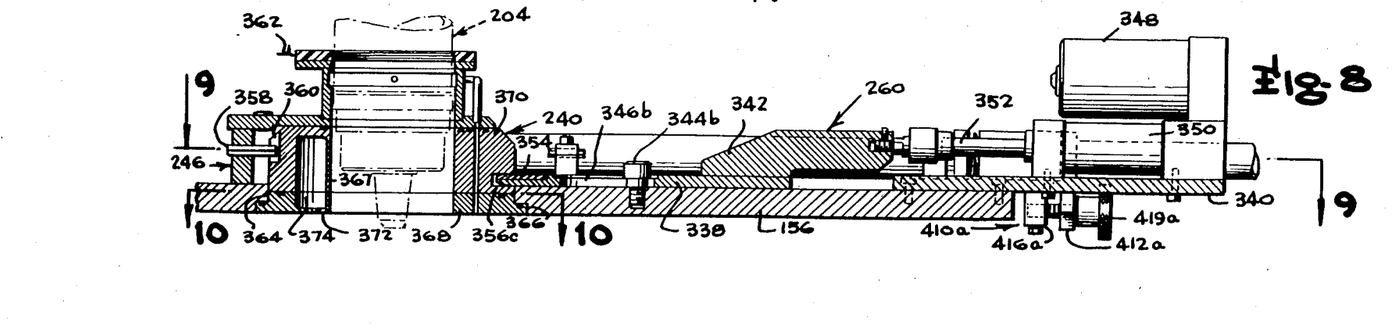
FIG. 8 is a side, sectioned view of the manifold latch assembly as taken along line 8—8 of FIG. 7.
Figure 9:
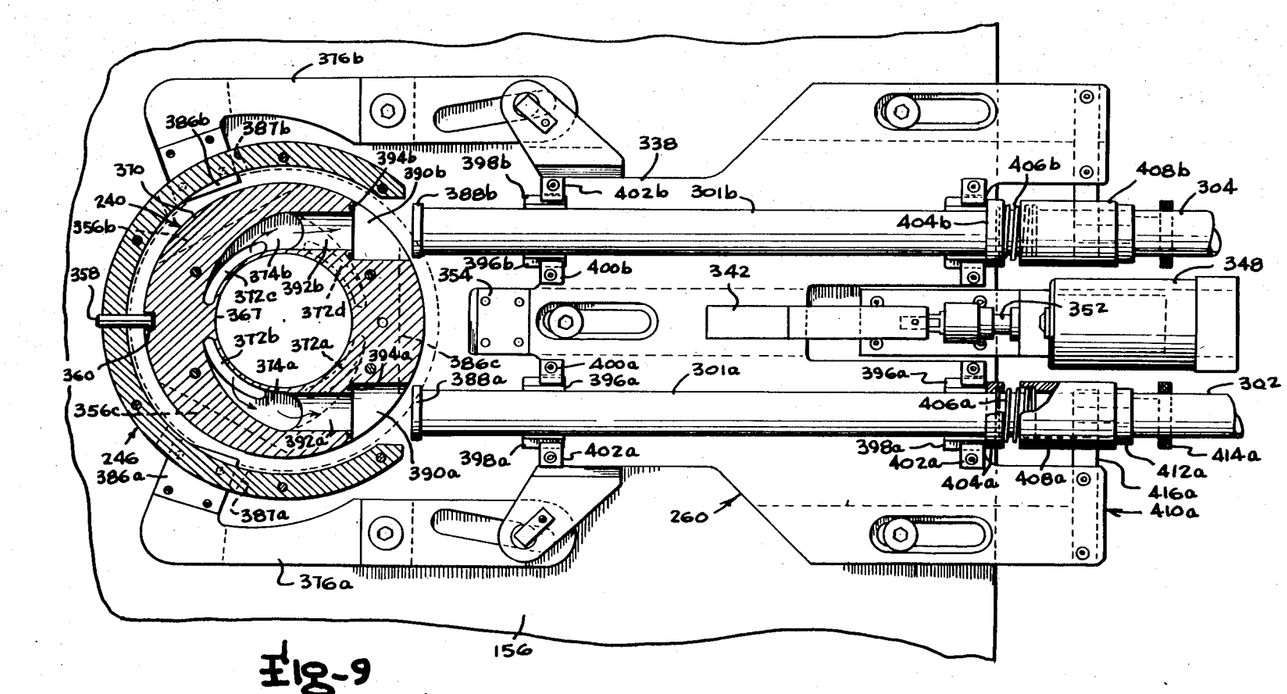
FIG. 9 is a plan, sectioned view of the manifold latch assembly and the gas collection manifold as taken along line 9—9 of FIG. 8.

When the chamber sealing assembly 244 has been so actuated to seal the welding chamber 108, argon is introduced into the welding chamber 108 to collect and to remove zircaloy fines as produced by the welding of the fuel rod grid 16. The argon with zircaloy fines suspended therein exits through a corresponding one of a pair of gas collection manifolds 240a and 240b, as shown in FIGS. 8 and 9, to be removed by an inert gas exhaust system 248. The exhaust system 248 comprises gas collection manifolds 240a and 240b which are associated respectively with the welding chambers 108a and 108b and are respectively connected by respective sets of tubes 302 and 304, and 250 and 252 to a manifold 254. As will be explained in greater detail later, the manifold 254 is coupled to a particle removal system 256 for receiving the argon with the zircaloy fines suspended therein, for removing the zircaloy fines and for discharging them into a waste system. As shown in FIGS. 5 and 6, the particle collection system 256 is coupled with the exhaust conduit 258, whereby the argon is discharged into the atmosphere exterior of the building enclosing the laser welding system 102. As shown in FIG. 4, a pair of lens seal housings 246a and 246b is associated respectively with the laser welding chambers 108a and 108b for guiding the laser focusing lens assembly 204a and 204b, as well as to form an enclosure about their respective gas collection manifolds 240a and 240b. A pair of manifold latch assemblies 260a and 260b are respectively associated with the gas collection manifolds 240a and 240b for securing their respective gas collection manifolds 240a and 240b with respect to the sealing plates 156a and 156b, as well as for coupling the corresponding sets of the exhaust tubes 302 and 304 to the gas collection manifolds 240a and 240b.

Referring now to FIGS. 5 and 6, the details of the inert gas exhaust system 248 and the particle removal system 256 are best shown. The inert gas exhaust system 248 serves to remove the inert gas with the zircaloy fines suspended therein from each of the welding chambers 108a and 108b and, in particular, its associated gas collection manifold 240a and 240b, as suggested in dotted line in FIG. 5. Each manifold 240 is coupled via a pair of rigid exhaust tubes 302 and 304 and a pair of flexible exhaust tubes 250 and 252 to a manifold 254. The rigid exhaust tubes 302 and 304 may be decoupled from their associated gas collection manifold 240, whereby the manifold 240 may be removed and cleaned, the zircaloy fines being removed therefrom. The flexibility of the exhaust tubes 250 and 252 permit the rectilinear movement of the rigid tubes 302 and 304.

The manifold 254 is coupled with the particle removal system 256, whereby the zircaloy fines or particles are removed from the inert gas and discharged into a sewer or waste removal system. The manifold 254 includes a flapper 306 that is pivotably mounted by a hinge 308 to be moved from a closed position, as shown in full line in FIG. 6, to an open position, as shown in dotted line. The flapper 306 is driven by a drive assembly 310 to its open position to prevent a pressure buildup within its welding chamber 108.

Argon, carrying the zircaloy fines, enters the particle removal system 256 and, in particular, a wet scrubber 316. As shown in FIG. 6, the wet scrubber 316 includes a venturi 314, which receives water via a water inlet 312 for atomizing the water into a spray to "wash" the argon. An inlet conduit 320 directs the argon into a water web filter 318 which comprised a series of fine mesh filters. The filters are subjected to a continuous stream of water which washes away the zircaloy fines. The wet scrubber 316 and the water web filter 318 may illustratively take the form of those elements as manufactured by Heat Systems, Ultrasonics, Inc., Farmingdale, N.Y. under the respective model numbers HSM 2RCMV and MYSTAIRE. After the zircaloy fines have been removed, the argon is drawn by an exhaust blower 324 through connecting conduits 322 and 326 to be discharged via the exhaust conduit 258 to the exterior of the housing containing the laser machining system 102.

As mentioned above, the argon leaking from the welding chamber is heavier than air and falls through large openings (not shown) into the main frame 122, which serves as an exhaust plenum for the argon. A negative pressure is established within the main frame 122 by the duct blower 329, whereby the argon is conveyed via the transition duct 328 to be exhausted through the exhaust conduit 258.

Figure 7:
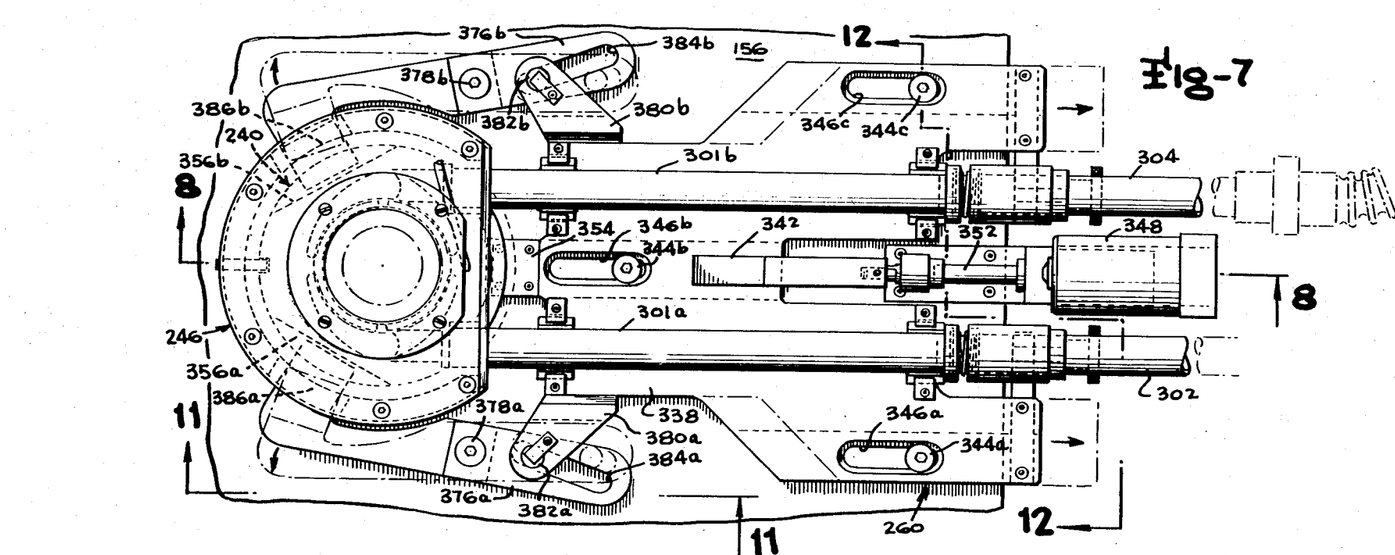
FIG. 7 is a plan view of a manifold latch assembly and the gas collection manifold of the particulate collection system of this invention.

Referring now to FIGS. 7, 8 and 9, the structure and the operation of the manifold latch assembly 260 to secure its gas collection manifold 240 in place and to facilitate the decoupling and coupling of the rigid exhaust tubes 302 and 304 will now be explained. It is understood that in the course of collecting and removing the zircaloy fines from the laser welding system 102, that some zircaloy fines will be caught within the gas collection manifold 240 necessitating the cleaning of the manifold 240. As shown particularly in FIG. 8, the gas collection manifold 240 is received and positioned within the lens seal housing 246, which also provides an opening for tightly receiving and sealing the laser focusing lens assembly 204. The gas collection manifold 240 is positioned in part by a slot key 358 fixedly disposed within the lens seal housing 246 and extending to be received in a guide slot 360 of the gas collection manifold 240, whereby the manifold 240 is oriented with respect to the manifold opening 364 disposed through the sealing plate 156. As shown in FIG. 8, the gas collection manifold 240 includes a bottom manifold 368 and a top manifold 370 that form together the gas collection manifold 240. The manifold opening 364 has a flange 366 for receiving a portion of the bottom manifold 368, whereby the lens housing opening 367 is aligned with the laser focusing lens assembly 204.

The gas collection manifold 240 is releasably locked in place by the manifold latch assembly 260 as will be explained now. The manifold latch assembly 260 employs a pair of pivoting latch arms 376a and 376b, and a latch mounting plate 338 for releasably engaging and securing the gas collection manifold 240 in place. In addition, the manifold latch assembly 260 serves to couple and decouple the rigid exhaust pipes 302 and 304 with respect to the gas collection manifold 240 facilitating the easy removal and cleaning thereof. FIG. 7 illustrates a pair of slidable exhaust tubes 301a and 301b which are coupled with the gas collection manifold 240, whereas FIG. 9 shows the pair of sliding exhaust tubes 301a and 301b decoupled or removed from the gas collection manifold 240.

The manifold latch assembly 260 comprises a latch mounting plate 338 shown in a first or latch position in FIG. 7 and in a second or unlatched position in FIG. 9. The latch mounting plate 338 is driven between its first and second positions by a drive motor 348 mechanically coupled to the latch mounting plate 338 by a cylindrical screw mechanism 350 that provides a mechanical advantage to the rotational output of the drive motor 348 to drive rectilinearly a piston 352, which is in turn coupled by a block 342 to the latch mounting plate 338. As best illustrated in FIG. 7, the latch mounting plate 338 is guided between its first and second positions by a plurality of guide pins 344a, 344b and 344c, which are respectively received by a corresponding plurality of guide slots 346a, 346b and 346c.

Figure 11:
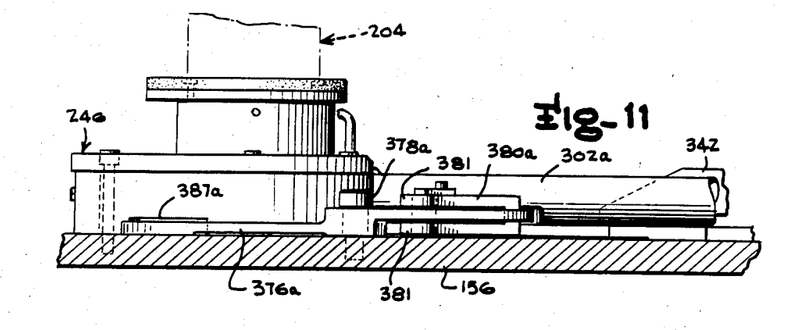
FIG. 11 is a side, partially sectioned view of the manifold latch assembly as taken along line 11—11 of FIG. 7.

As illustrated in FIGS. 7, 8 and 9, the gas collection manifold 240 is releasably secured to the sealing plate 156 by the manifold latch assembly 260 and, particularly, by its pair of pivoting latch arms 376a and 376b. The latch arms 376a and 376b are pivotably mounted by a pair of wing supports 380a and 380b fixedly attached to the leading end of the latch mounting plate 338. As illustrated in FIG. 11, each of the wing supports 380 has a pair of bifurcated arms 381 for receiving therebetween one end of its pivoting latch arm 376. Each pivoting latch arm 376 has a drive slot 384 therein for receiving a drive roller 382 rotatably mounted between the arms 381 of the wing support 380. Further, each pivoting latch arm 376 is pivotably mounted upon its pin 378 and includes, at the other end, a retaining finger 386 configured inwardly. As illustrated in FIGS. 4 and 9, each of the retaining fingers 386a and 386b is designed to be directed through corresponding openings 387a and 387b of the lens seal housing 246 and into a corresponding one of the retaining slots 356a and 356b of the gas collection manifold 340.

In operation, when it is desired to latch the gas collection manifold 240 to the sealing plate 156, the drive motor 348 is electrically energized to drive the latch mounting plate 338 to the left, as shown in FIGS. 7, 8 and 9, whereby each of the pivoting latch arms 376 is driven to that position, as shown in full line in FIG. 7, wherein the retaining fingers 386a and 386b are disposed within the corresponding retaining slots 356a and 356b, thus, securing the gas collection manifold 240 to the sealing plate 156. In addition, a wear pad 354 is disposed upon the leading edge of the latch mounting plate 338 and, in the first position thereof, is inserted into a corresponding retaining slot 356a of the gas collection manifold 240, as shown in FIG. 8. When it is desired to unlatch the gas collection manifold 240 whereby it may be readily removed and cleaned, the drive motor 348 is actuated to disposed the latch mounting plate 338 to its second position, as shown in FIG. 9, whereby the retaining fingers 386a and 386b, and the wear pad 354 are withdrawn from the corresponding retaining slots 356a, 356b and 356c of the gas collection manifold 240.

Figure 10:
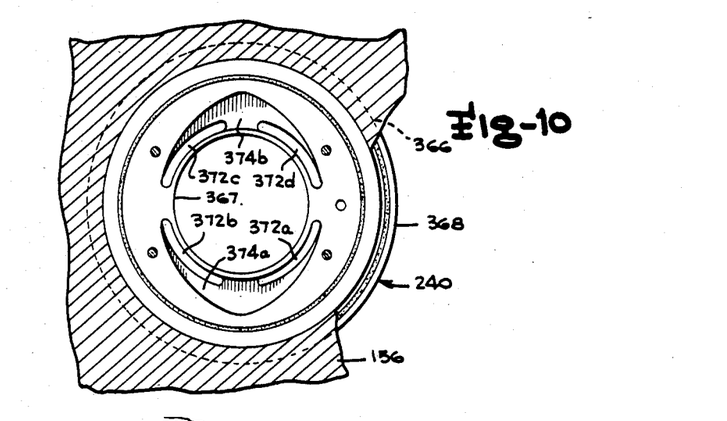
FIG. 10 is a plan, sectioned view of the gas collection manifold as taken along line 10—10 of FIG. 8.

The gas collection manifold 240 is most clearly illustrated in FIGS. 8, 9 and 10 and is particularly designed to be readily removed from the sealing plate 156, disassembled, and cleaned before being returned to the manifold opening 364 within the sealing plate 156. After a given number of laser welding operations, the zircaloy fines will collect within the gas collection manifold 240, thus, necessitating its cleaning. As shown in FIG. 8, the gas collection manifold 240 has the bottom manifold 368 and the top manifold 370 cooperating together. The bottom manifold 368, as shown in FIG. 9, has a plurality of exit ports 372a, 372b, 372c and 372d that permit the argon carrying the zircaloy fines to escape from the welding chamber 108 disposed therebelow. As illustrated in FIG. 10, a pair of the exit ports 372a and 372b communicate with a transition cavity 374a, whereas the pair of exit ports 372c and 372d communicate with a transition cavity 374b. The gas collection manifold 240 and, in particular, its transition cavities 374a and 374b are particularly designed to minimize any decrease in the gas flow velocity of the argon. It is understood that if the gas collection manifold 240 were to create significant reductions in gas flow velocity, that the zircaloy fines would drop out of the argon to be otherwise collected within the laser welding system 102 in contrast to the desired object to collect and remove the zircaloy fines. To maintain gas flow velocity, the exit ports 372 and the transition cavities 374 are carefully configured to direct the argon from the ports 372 to a corresponding pair of exit conduits 392a and 392b without significant reduction in gas flow velocity. As particularly shown in FIG. 9, the dimensions of the transition cavities 374 gradually increase from those of the narrow exit ports 372 to the larger diameter of the exit conduits 392a and 392b. Further, the exit conduits 392a and 392b intersect with each of the corresponding transition cavities 374a and 374b at their approximate mid point to further facilitate the argon flow.

As best shown in FIGS. 7 and 9, the rigid tubes 301a and 301b are slidably mounted with respect to the latch mounting plate 338 to facilitate tensioned coupling with the gas collection manifold 240. The leading ends of the pair of the sliding tubes 301a and 301b are annularly-shaped sealing flanges 388a and 388b, respectively. The sealing flanges 388a and 388b are designed to be inserted respectively through insert sections 390a and 390b formed of a similar configuration within the gas collection manifold 240. When the sliding tubes 301a and 301b are disposed fully forward, their respective sealing flanges 388a and 388b mate with corresponding one's of a pair of O rings 394a and 394b, thus, preventing the loss of argon as flows from the welding chambers 108 via the exit ports 372, the transition cavities 374 and the exit conduits 392 and into corresponding one's of the sliding tubes 301a and 301b.

Figure 12:
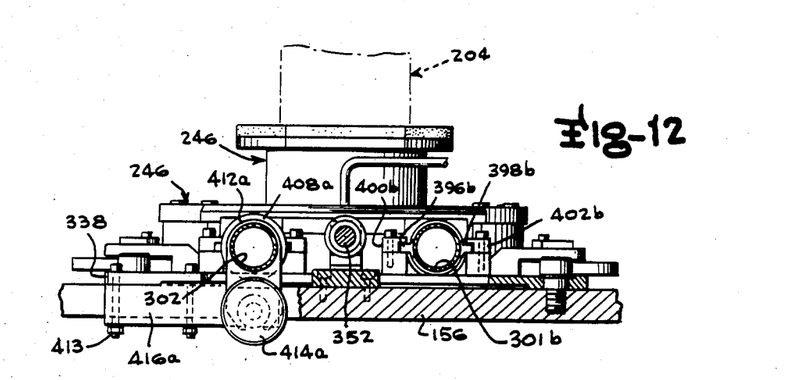
FIG. 12 is a partially sectioned view of the manifold latch assembly as taken along line 12—12 of FIG. 7.

As best illustrated in FIGS. 9 and 12, each of the sliding tubes 301a and 301b is slidably mounted upon the latch mounting plate 338 by a plurality of tube support members 400 and 402. As shown in FIG. 12, a support member 400b is disposed upon one side of its sliding tube 301b, whereas a complimentary support member 402b is disposed on the otherside thereof. A pair of wings 396b and 398b is disposed and affixed to opposite sides of the sliding tube 301b. Each of the support members 400b and 402b has a corresponding slot for receiving respectively its wing 396b or 398b. As illustrated in FIG. 9, two sets of support members 400 and 402 are disposed with each tube 301.

As best shown in FIG. 9, the sliding tubes 301 are coupled to the rigid exhaust tubes 302 and 304 in a manner to permit the tubes 301a and 301b to slide and to permit a corresponding one of a pair of biasing springs 406a and 406b to exert a tension on its corresponding tube 301, whereby its sealing flange 388 is biased against the corresponding O ring 394. A pair of collars 408a and 408b is attached to corresponding exhaust tubes 302 and 304 for receiving a corresponding one of the pair of biasing springs 406a and 406b. The other ends of the biasing springs 406a and 406b abut against a corresponding one of a pair of abutting flanges 404a and 404b, thus, biasing each of the sliding tubes 301a and 301b to the left, as shown in FIG. 9. The extent of travel of the tubes 301a and 301b is illustrated by comparing the position of the sliding tubes 301 in FIG. 9 and in FIG. 7, noting that in FIG. 7 the tubes 301a and 301b are disposed against the gas collection manifold 240 and are slid to the right slightly relative to their support members 400 and 402.

Referring now to FIGS. 8, 9 and 12, the structure and operation of a tube travel adjustment mechanism 410 will now be explained. One of a pair of tube travel adjustment mechanisms 410a and 410b is respectively associated with each of the pair of collars 408a and 408b to define the extent of movement of its corresponding sliding tube 301a and 301b. The mechanism 410 includes a support member 416 affixed by suitable fasteners 413 to the latch mounting plate 338, as shown in FIG. 12. A coupling member 412 is affixed to each of the conduits 302 and 304 for receiving a corresponding one of a pair of adjustment knobs 414a and 414b having a threadable portion received by its support member 416, whereby rotation of the knob 414 adjusts the position of the coupling member 412 and, therefore, the position of the collar 408a. Adjustment of the collars 408 to the left, as shown in FIG. 9, increases the tension imposed by the biasing springs 406 upon their corresponding sliding tubes 301 and decreases the extent of rectilinear movement thereof.

Figure 13:
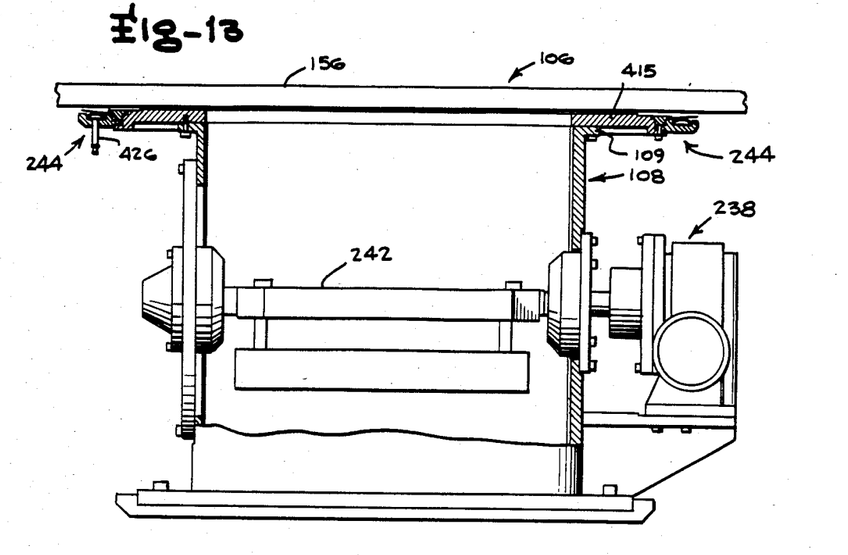
FIG. 13 is a side, partially sectioned view of the welding chamber of the laser welding apparatus as taken along line 13—13 of FIG. 4.
Figure 14:
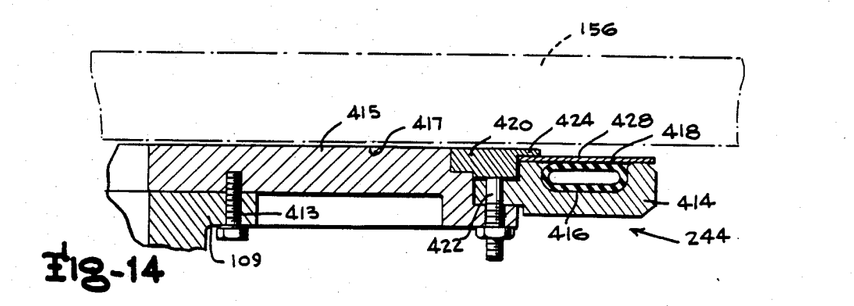
FIGS. 14 and 15 are side, sectioned views respectively of the chamber sealing assembly of the laser welding chamber showing a seal in a sealing relationship with the sealing plate and in a non-sealing relationship with the sealing plate of the laser welding apparatus.
Figure 15:
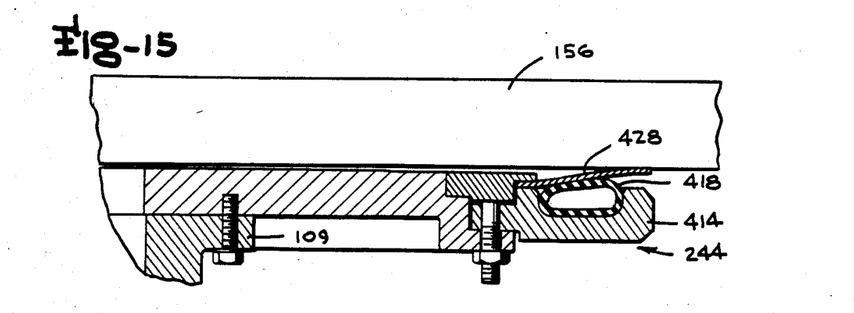

Referring now to FIGS. 13, 14 and 15, the details and operation of the chamber sealing assemblies 244a and 244b to prevent escape of the argon and the zircaloy fines carried thereby will be given. Referring initially to FIGS. 4 and 13, the chamber sealing assembly 44 is supported with respect to the top-most flange 109 of the welding chamber 108 by an annularly-shaped support member 415 affixed to the flange 109 by suitable fasteners. As illustrated in FIG. 4, the outer periphery of the support member is of a circular configuration and supports a sealing plate 428 that is actuable to abut the lower surface of the sealing plate 156, whereby the welding chamber 108 is effectively sealed except for the exit ports 372 provided within the gas collection manifold 240. The actuating element comprises an inflatable sealing element 418 that is molded as a circular tube of a suitable, flexible material such as neoprene. As shown in FIG. 13, the inflatable sealing element 418 includes a nipple 426 that is coupled to a source of pressure, whereby the inflatable sealing element 418 may be inflated and its seal ring 428 flexed to that position, as shown in FIG. 15, abutting the lower surface of the sealing plate 156. Illustratively, the seal 428 ring may be made of glass filed teflon. It is important that the chamber sealing assembly 244 does not cause significant friction with respect to the sealing plate 156, as it is repositioned for the next weld. To this end, the lower surface of the sealing plate 156 is a polished chrome surface. In addition, the sealing element 418 is inflated with approximately 2 to 3 psi so that the sealing ring 428 is disposed with a modest force against the lower, polished surface of the sealing plate 156. In this manner, the welding chamber 108 may be readily move by the X-Y position system 288 without substantial drag being imposed thereon. As shown in FIGS. 14 and 15, the seal ring 428 is held at its inner peripheral edge by an annularly-shaped retaining plate 420 affixed to support member 414 by suitable fasteners 422. As shown in FIG. 14, a space is left between an upper surface 417 of the annular support member 415 and the lower surface of the sealing plate 156 to facilitate easy removal of the welding chamber 108 to a position as shown in FIGS. 3 and 4.

The operation of the laser machine apparatus 102 comprises the three sequentially occuring cycles including a loading cycle, a purging cycle, and a welding cycle. After one fuel rod grid 16 has been welded, the slide 262 and its welding chamber 108 is withdrawn from its positioning module 106. In this position, the welded fuel rod grid 16 may be readily removed and a new fuel rod grid 16 to be welded inserted within the welding chamber 108. During this loading cycle, zircaloy fines that may have been deposited within the gas collection manifold 240 may be removed. In particular, the flapper 306 is returned by the drive assembly 310 to its closed position, as shown in full line in FIG. 6. As a result of the closure of the flapper 306, a negative pressure is established by the blower 324 within the gas collection manifold 240. With the flapper 306 closed, the blower 324 establishes a pressure of approximately ten inches of water within the manifold 254, whereby air is drawn through the gas collection manifold 240, the exhaust tubes 302 and 304, the flexible tubes 250 and 252 and the manifold 254. The air so introduced will rapidly oxidize the zircaloy fines throughout the gas exhaust system 248, thereby reducing the chance that deposits of the zircaloy fines may accumulate and then rapidly burn or explode.

After completion of the loading cycle in which the next fuel rod grid 16 to be welded has been loaded into the welding chamber 108 and any accumulated zircaloy fines are removed introducing air, the slide 262 and its loaded welding chamber 108 is returned to within its positioning module 106, as illustrated in FIG. 4. Now, the laser welding apparatus 102 is operated in its purging cycle to remove air from the welding chamber 108. The residual air within the welding chamber 108, that might otherwise contaminate wells of the fuel rod grid 16, is exhausted by introducing an inert gas, e.g., argon, into the welding chamber 108. Illustratively, as explained in detail in the above reference copending patent application entitled, "ARGON PURGED WELDING CHAMBER", argon is introduced via conduits (not shown) within the rotatable fixture 242 and a diffuser (not shown) within the bottom of the welding chamber 108, as shown in FIGS. 4 and 13. Argon is introduced at a relatively high rate to purge the welding chamber 108 of entrained air and moisture until preset levels thereof are sensed. In the purging cycle, the sealing ring 428 is not actuated, whereby the overflow of argon may escape through that space between the upper surface 417 of the annular support member 415 and the lower surface of the sealing plate 156, as shown in FIG. 14.

Next, the welding cycle is carried out whereby the slot and tab wells 34, the corner seam wells 30, and the intersect wells 32 are effected within the inert atmosphere established within the welding chamber 108. During these laser welding operations, the flapper 306 of the manifold 254 is raised to its open position, as shown in dotted line in FIG. 6, whereby the negative pressure established by the exhaust blower 324 not only within the manifold 254, but also within the welding chamber 108 is relieved. Otherwise, the vacuum or negative pressure would cause the argon to be withdrawn from the welding chamber 108, possibly leading to the introduction of air within the welding chamber 108, whereby the resultant welds may be contaminated. During the welding cycle, the inert gas is introduced within the welding chamber 108, increasing the pressure of the argon atmosphere until the argon is discharged through the gas collection manifold 240, the exhaust tubes 302 and 304 and the flexible tubes 250 and 252 into the manifold 254. The exhaust blower 324 is effective to withdraw the argon so introduced into the manifold 254 into the particle collection system 236, wherein the zircaloy particles are removed and the argon is exhausted through the exhaust conduit 258.

After a given number of fuel rod grids 16 have been welded, it is contemplated that an unacceptable quantity of zircaloy fines will remain within the gas collection manifold 240. As illustrated in FIGS. 7 and 9, the manifold latch assembly 260 and, in particular, its latch mounting plate 338 is disposed to the right, whereby the sliding tubes 301 are removed from the gas collection manifold 240 and, further, the pivoting latch arms 376, as well as the wear pad 354, are removed from the retaining slots 356. Now, the gas collection manifold may be removed from the lens seal housing 246 and separated into its bottom manifold 368 and top manifold 370, whereby the ports 372, the transition cavities 374 and the exit conduits 392 may be cleaned of zircaloy fines. In order to remove the gas collection manifold 240, the operator withdraws the slide 262 and the welding chamber 108 from its positioning module 106, as shown in FIG. 4. Thereafter, the operator closes a switch (not shown), whereby the manifold latch assembly 260 is operated to release the gas collection manifold 240. In particular, the drive motor 348 is energized to withdraw the latch mounting plate 338 to the right as seen in FIG. 9, whereby the wear pad 354 and the retainer fingers 386 are withdrawn from the gas collection manifold 240. Now, as seen in FIG. 8, the gas collection manifold simply drops from its opening 364 within the sealing plate 156 to be cleaned by the operator. Thereafter, the gas collection manifold 240 may be reassembled, reinserted into the manifold opening 364 of the sealing plate 156, before finally being secured therein by the manifold latch assembly 260.

In considering this invention, it should be remembered that the present disclosure is illustrative only and the scope of the invention should be determined by the appended claims.

I claim:

1. Welding apparatus for directing a welding beam onto a work piece made of a material, whereby extraneous particles of the work piece are thrown off, and for collecting and disposing of the extraneous work piece particles, said welding apparatus comprising:
   (a) a welding chamber for receiving the work piece and for establishing a welding environment about the work piece, said welding welding chamber having an opening and input port means for introducing a non-reactive gas into said welding chamber to establish the welding environment within said welding chamber;
   (b) output port means associated with said welding chamber for permitting the escape of the non-reactive gas therefrom;
   (c) means for generating and directing the welding beam through said output port means, into said welding chamber and onto the work piece;
   (d) manifold means disposed about said output port means for receiving and collecting said non-reactive gas and the work piece particles suspended therein; and
   (e) sealing means associated with said opening for operating in a first mode for sealing said opening to prevent escape of the non-reactive gas except through said output port means and said manifold means, and in a second mode to permit escape of the non-reactive gas through said opening.

2. The wleding apparatus as claimed in claim 1, wherein there is further included means adapted to be coupled to said manifold means for receiving the non-reactive gas and the work piece particles suspended therein and for separating the work piece particles from the non-reactive gas.

3. The welding apparatus as claimed in claim 2, wherein there is further included means coupled to said separating means for coupling and decoupling said separating means to and from said manifold means.

4. The welding apparatus as claimed in claim 3, wherein said coupling and decoupling means comprises latching means disposable in a first position to latch said manifold means with respect to said output port means and disposable in a second position, wherein said manifold means may be removed from said output port means to permit cleaning of the work piece particles therefrom.

5. The welding apparatus as claimed in claim 1, wherein said welding chamber comprises an upper edge defining said opening and there is further included a sealing plate disposed uniformly spaced from said upper edge to permit the free movement of said welding chamber with respect to said sealing plate.

6. The welding apparatus as claimed in claim 5, wherein said sealing plate comprises said output port means.

7. The welding apparatus as claimed in claim 6, wherein there is included means for generating and directing the welding beam via said output port means into said welding chamber and onto the work piece.

8. The welding apparatus as claimed in claim 7, wherein said sealing means is operative in its first mode for effecting a seal between said upper edge and said sealing plate.

9. The welding apparatus as claimed in claim 8, there is included means for moving selectively said welding chamber and its work piece disposed therein with respect to the welding beam and said sealing plate.

10. The welding apparatus as claimed in claim 9, wherein said sealing plate comprises a substantially planar surface disposed at a substantially uniform spacing from said upper edge and said moving means moves said welding chamber and its said upper edge along paths that define a second, substantially planar surface that is disposed substantially parallel with said first mentioned planar surface.

11. The welding apparatus as claimed in claim 8, wherein said sealing means is mounted upon said upper edge of said welding chamber.

12. The welding apparatus as claimed in claim 11, wherein said sealing means comprises an inflatable element, and a sealing member that is disposed in a sealing relationship between said upper edge and said sealing plate upon the inflation of said inflatable element.

13. Welding apparatus for directing a welding beam onto a work piece, whereby extraneous particles of the work piece are thrown off, and for collecting and disposing of the extraneous work piece particles, said welding apparatus comprising:
   (a) a welding chamber for receiving the work piece and for establishing a welding environment about the work piece, said welding chamber having an upper edge defining an opening and input port means for introducing a non-reactive gas into said welding chamber to establish the welding environment within said welding chamber;
   (b) a sealing plate disposed at a substantially uniform spacing from said upper edge and comprising output port means for permitting the escape of the non-reactive gas from said welding chamber and through said output port means;
   (c) means for generating and directing the welding beam through said output port means, into said welding chamber and onto the work piece, said welding beam being disposed in a fixed relationship with respect to said sealing plate;
   (d) means for moving selectively said welding chamber and the work piece with respect to the welding beam and said sealing plate;
   (e) manifold means disposed about said output port means for receiving and collecting said non-reactive gas and the work piece particles suspended therein; and
   (f) sealing means associated with said welding chamber and operating in a first mode for sealing said spacing to prevent escape of the non-reactive gas except through said output port means and said manifold means, and in a second mode for permitting the non-reactive gas to escape through said spacing.

14. The welding apparatus as claimed in claim 13, wherein said sealing plate comprises a substantially planar surface disposed at a substantially uniform spacing from said upper edge and said moving means moves said welding chamber and its said upper edge along paths that define a second, substantially planar surface that is disposed substantially parallel with said first mentioned planar surface.

15. The welding apparatus as claimed in claim 13, wherein said sealing means comprises an inflatable element, and a sealing member that is disposed in a sealing relationship between said upper edge and said sealing plate upon the inflation of said inflatable element.

16. The welding apparatus as claimed in claim 15, wherein said inflatable element comprises a flexible, tubular member of substantially circular configuration, said sealing member being formed as an annular ring, said sealing means comprising means for mounting said inflatable element and said sealing member upon said upper edge of said welding chamber, said sealing member in said first mode being disposed in contact with said substantially planar surface of said sealing plate, said sealing member in its second mode being disposed remote from said substantially planar surface of said sealing plate.

17. Apparatus for collecting and removing particles of a work piece thrown off in the course of machining the work piece, said apparatus comprising:
    (a) a machining chamber for receiving the work piece and for establishing a machining environment about the work piece, said machining chamber having an input port means for introducing a gas into said machining chamber to establish the machining environment therein;
    (b) output port means associated with said machinery chamber for permitting the escape of the gas therefrom;
    (c) manifold means disposed with respect to said output means for collecting the gas with the work piece particles suspended therein, said manifold means comprising means for defining an input opening in communication with said machining chamber, means for defining an output opening and a cavity interconnecting said input and output openings for the transmission of the gas with the work piece particles suspended therein; and
    (d) means for releasably securing said manifold means with respect to said output port means, whereby said manifold means may be removed and cleaned of the work piece particles.

18. The collecting apparatus as claimed in claim 17, wherein there is included conduit means adapted to be coupled and decoupled with respect to said output opening of said manifold means.

19. The collecting apparatus as claimed in claim 18, wherein said securing means includes means for disposing said conduit means in a first position, whereby said conduit means is disposed in a coupled relationship with said output opening to permit the flow of the gas with the work piece particles suspended therein from said manifold means through said conduit means, and a second position remote of said manifold means, wherein said manifold means may be readily removed from said output port means.

20. The collecting apparatus as claimed in claim 19, wherein said securing means comprises a movable plate for receiving said conduit means and movable between said first and second positions, and drive means coupled to drive said movable plate between said first and second positions.

21. The collecting apparatus as claimed in claim 20, wherein said securing means comprises a latch coupled to said movable plate to be disposed between a first position free of said manifold means and a second position, wherein said latch means engages said manifold means and secures said manifold means with respect to said output opening.

22. Welding apparatus for directing a welding beam onto a work piece, whereby extraneous particles of the work piece are thrown off, and for collecting and disposing of the extraneous work piece particles, said welding apparatus comprising:
    (a) a welding chamber for receiving the work piece and for establishing a welding environment about the work piece, said welding chamber having an upper edge defining an opening and input port means for introducing a non-reactive gas into said welding chamber to establish the welding environment within said welding chamber;
    (b) a sealing plate disposed at a substantially uniform form spacing from said upper edge and comprising output port means for permitting the scape of the non-reactive gas from said welding chamber and through said output port means;
    (c) means for generating and directing the welding beam through said output port means, into said welding chamber and onto the work piece;
    (d) means for moving selectively said welding chamber and the work piece with respect to the welding beam and said sealing plate, said welding beam being disposed in a fixed relationship with respect to said sealing plate;
    (e) manifold means disposed about said output port means for receiving and collecting said non-reactive gas and the work piece particles suspended therein, said manifold means comprising mean for defining an input opening in communication with said welding chamber, means for defining an output opening and a cavity interconnecting said input and output openings for the transmission of the gas with the work piece particles suspended therein;
    (f) sealing means associated with said welding chamber and operative in a first mode for sealing said spacing to prevent escape of the non-reactive gas except through said output port means and said manifold means, and in a second mode for permitting the non-reactive gas to escape through said spacing; and
    (g) means for releasably securing said manifold means with respect to said output port means, whereby said manifold means may be removed and cleaned of the work piece particles, said securing means comprising conduit means adapted to be coupled and decoupled with respect to said output opening of said manifold means, means for disposing said conduit means in a first position, whereby said conduit means is disposed in a coupled relationship with said output opening to permit the flow of the gas with the work piece particles suspended therein from the manifold means through said conduit means, and a second position remote of said manifold means, wherein said manifold means may be readily removed from said output port means, a movable plate for receiving said conduit means and movable between said first and second positions, drive means coupled to drive said movable plate between first and second positions, and a latch coupled to said moveable plate to be disposed between a third position free of said manifold means and a fourth position, wherein said latch means engages said manifold means and secures said manifold means with respect to said output opening.

23. Welding apparatus for directing a welding beam onto a work piece made of a material, whereby extraneous particles of the work piece are thrown off, and for collecting and disposing of the extraneous work piece particles, said welding apparatus comprising:
    (a) a welding chamber for receiving the work piece and for establishing a welding environment about the work piece, said welding chamber having an opening and input port means for introducing a non-reactive gas into said welding chamber to establish the welding environment within said welding chamber;
    (b) output port means associated with said welding chamber for permitting the escape of the non-reactive gas therefrom;
    (c) means for generating and directing the welding beam through said output port means, into said welding chamber and onto the work piece;
    (d) manifold means disposed about said input port means for receiving and collecting the non-reactive gas and the work piece particles suspended therein;
    (e) sealing means associated with said opening for operating in a first mode for sealing said opening to prevent escape of the non-reactive gas except through said output port means and said manifold means, and in a second mode to permit escape of the non-reactive gas through said opening;
    (f) means adapted to be coupled to said manifold means for receiving the non-reactive gas and the work piece particles suspended therein and for separating the work piece particles from the non-reactive gas; and
    (g) means coupled to said separating means for coupling and decoupling said separating means to and from said manifold means, said coupling and decoupling means comprises latching means disposable in a first position to latch said manifold means with respect to said outport means and disposable in a second position, wherein said manifold means may be removed from said input port means to permit cleaning of the work piece particles therefrom;
    (h) said manifold means comprises first and second sections matable with each other for forming a conduit leading from an input port to an output port, said input port disposed in association with said output port and said output port means coupled by said coupling and decoupling means with said separating means.

24. Welding apparatus for directing a welding beam onto a work piece made of a material, whereby extraneous particles of the work piece are thrown off, and for collecting and disposing of the extraneous work piece particles, said welding apparatus comprising:
    (a) a welding chamber for receiving the work piece and for establishing a welding environment about the work piece, said welding chamber having an opening and input port means for introducing a non-reactive gas into said welding chamber to establish the welding environment within said welding chamber, said welding chamber comprises an upper edge defining said opening;
    (b) a sealing plate disposed uniformly spaced from said upper edge to permit the free movement of said welding chamber with respect to said sealing place;
    (c) output port means associated with said welding chamber for permitting the escape of the non-reactive gas therefrom, said sealing plate comprises said output port means;
    (d) means for generating and directing the welding beam through said output port means, into said welding chamber and onto the work piece;
    (e) manifold means disposed about said output port means for receiving and collecting said non-reactive gas and the work piece particles suspended therein;
    (f) sealing means associated with said opening for operating in a first mode for sealing said opening to prevent escape of the non-reactive gas except through said output port means and said manifold means, and in a second mode to permit escape of the non-reactive gas through said opening, said sealing means is operative in its first mode for effecting a seal between said upper edge and said sealing plate; and
    (g) means for moving selectively said welding chamber and its work piece disposed therein with respect to the welding beam and said sealing plate, said sealing plate comprises a substantially planar surface disposed at a substantially uniform spacing from said upper edge, said moving means moves said welding chamber and its said upper edge along paths that define a second, substantially planar surface that is disposed substantially parallel with said first mentioned planar surface, said sealing means is mounted upon said upper edge of said welding chamber;
    (h) said sealing means comprises an inflatable element, and a sealing member that is disposed in a sealing relationship between said upper edge and said sealing plate upon the inflation of said inflatable element, said inflatable element comprises a flexible, tubular member of substantially circular configuration, said sealing member being formed as an annular ring, said sealing means comprising means for mounting said inflatable element and said sealing member upon said upper edge of said welding chamber, said sealing member disposed in said first mode being disposed in contact with said substantially planar surface of said sealing plate, said sealing member in its second mode being disposed remote from said substantially planar surface of said sealing plate.

* * * * *